Patented May 28, 1929.

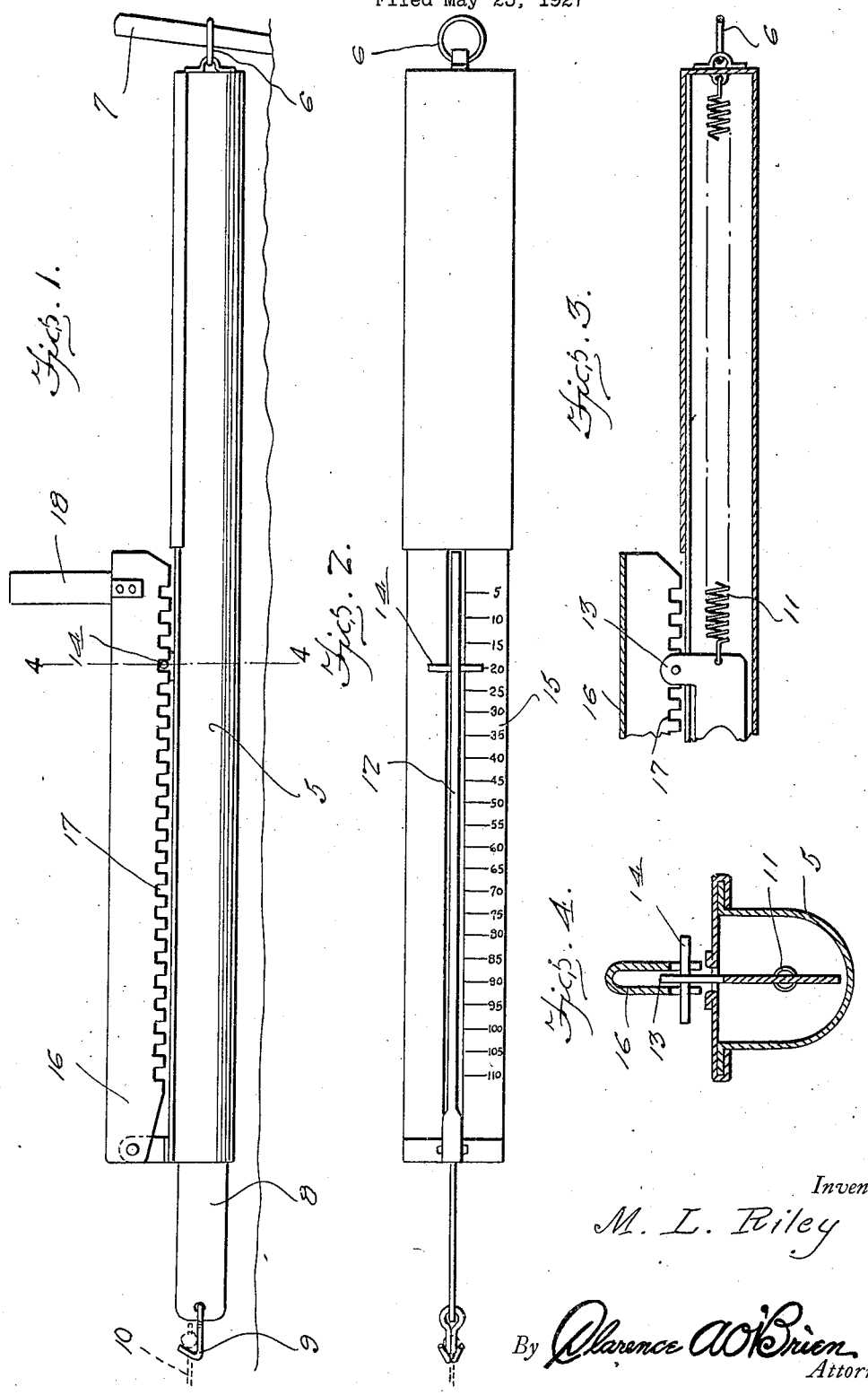

1,715,098

UNITED STATES PATENT OFFICE.

MATTHEW L. RILEY, OF JORDAN, MINNESOTA.

TENSION INDICATOR FOR CORN-PLANTER CHECK WIRES.

Application filed May 23, 1927. Serial No. 193,634.

My invention relates to indicating device for corn planter check wires whereby the tension of said wire may be uniformly adjusted so that in the planting of corn the cross rows as well as the longitudinally extending rows may be uniformly spaced.

In the planting of corn it is very important that each hill will be uniformly spaced from its adjacent hill so that in employing a multiple row cultivator the growing stalks will not be injured thereby. It is a customary practice to stretch a series of wires across the field to be planted operated as a trip for the corn planter to deposit the seed at a uniform distance apart and due to the flexible nature of such wire the same has a tendency to sag thereby resulting in an uneven spacing of the cross rows. By employing the use of a tensioning device constructed in accordance with my invention the trip wires are uniformly tensioned thereby permitting the cross rows to be uniformly spaced.

A further object of the invention is to provide a device of this character of simple construction, reliable in performance, durable and inexpensive to manufacture.

Other objects and advantages reside in the special construction, combination and arrangement of the various elements as more fully hereinafter described and claimed, reference being had to the accompanying drawing forming part hereof, wherein:

Figure 1 is an elevational view showing the device in operative position,

Figure 2 is a top plan view thereof,

Figure 3 is a longitudinal sectional view at the stake attaching end, and

Figure 4 is a transverse sectional view taken substantially along the line 4—4 of Figure 1.

Referring now to the drawing, I have shown my invention comprising a cylindrical casing 5 having an attaching ring 6 at one end thereof whereby to secure the same to a stake 7 or the like arranged at one end of the field to be worked. An opening is formed in the opposite end of the casing through which the rod 8 is slidably extended having a hook 9 arranged at its outer end for attachment to a corn planter trip wire 10 and a coil spring 11 attached to its inner end connecting the same to a stationary part of the casing.

A longitudinally extending slot 12 is arranged in the upper face of the casing through which protrudes an arm 13 carried on the inner end of the rod 8. A transversely arranged pin 14 is carried by the arm outwardly of the casing and constituting an indicating finger coacting with a scale marking indicated at 15 whereby to indicate the tension exerted upon the spring 11.

At one end of the casing is pivotally attached an arm 16 extending longitudinally thereof and arranged above the slot 12. The lower edge of said arm is provided with a row of notches 17 within which the pin 14 is adapted to be inserted. The free end of the arm is provided with a handle 18 whereby the same may be moved out of register with the pin. In the operation of the device after the same has been secured to the stake 7 at one end of the field and the corn planter trip wire has been attached at the opposite end thereof, the degree of tension of said wire will be indicated by the position of the pin 14 with respect to the scale marking on the casing indicated at 15. The arm 16 is then moved downwardly so as to engage said pin thereby forming a rigid connection between the wire 10 and the stake 7. By arranging the remaining wire tension indicators in a similar position the tension of the wires throughout the entire field will be uniformly secured. Also when arranging to set the wires for cross row planting by setting the device in the same relative position as that used for the longitudinal row planting, each row in the field will be planted in a uniformly spaced manner.

It is obvious that the device is susceptible to various changes and modifications without departing from the spirit of the invention or the scope of the appended claims and I accordingly claim all such forms of the invention to which I am entitled.

I claim:

1. In a device of the character described, a casing adapted to be fixedly secured at one end, a rod slidably mounted therein having attaching means at one end thereof and extending through the opposite end of the casing, means yieldably restraining movement of the rod, an arm pivotally attached at one end to the casing and having a rack bar formed along one edge thereof and indicating means carried by said rod whereby to indicate the relative position of the rod with respect to the casing, said indicating means being arranged for engagement with the rack bar for retaining the rod in a fixed position relative to said casing.

2. A tension indicating device for corn planter wires comprising a casing adapted to be fixedly secured at one end, a rod slidably mounted in said casing extending outwardly from the opposite ends thereof, resilient means connecting said rod to the casing, an arm pivotally mounted at one end to the casing, a pin arranged at the inner end of said rod and releasably engageable with said pivotally mounted arm and indicating means arranged on said casing and co-acting with said pin to indicate the relative position thereof with the casing.

3. In a tension indicating device for corn planter wires comprising a casing adapted to be fixedly secured at one end, a rod slidably mounted within the casing having one end extending therefrom and adapted to be secured to said wire, a spring yieldably connecting said rod to said casing, a longitudinally extending slot formed in the casing having the inner end of said rod extending therethrough, a pin carried by the extended end of said rod, a locking arm pivotally mounted at one end to the casing arranged above said slot and provided with a plurality of notches adapted to receive said pin and indicating means arranged on the casing co-acting with said pin whereby to indicate the relative position thereof with respect to the casing.

In testimony whereof I affix my signature.

MATTHEW L. RILEY.